(12) United States Patent
Meuer (10) Patent No.: US 7,657,541 B2
(45) Date of Patent: Feb. 2, 2010

(54) DISPLAYING AND ANALYZING DOCUMENT FLOWS

(75) Inventor: Peter Meuer, Langenfeld (DE)

(73) Assignee: SAP AG, Walldorf (DE)

( * ) Notice: Subject to any disclaimer, the term of this patent is extended or adjusted under 35 U.S.C. 154(b) by 768 days.

(21) Appl. No.: 10/946,525

(22) Filed: Sep. 20, 2004

(65) Prior Publication Data
US 2006/0080325 A1    Apr. 13, 2006

(51) Int. Cl.
*G06F 17/00* (2006.01)
(52) U.S. Cl. ................ 707/100; 707/101; 707/204
(58) Field of Classification Search ............. None
See application file for complete search history.

(56) References Cited

U.S. PATENT DOCUMENTS

| | | | | |
|---|---|---|---|---|
| 5,357,631 | A * | 10/1994 | Howell et al. | 707/203 |
| 6,081,814 | A * | 6/2000 | Mangat et al. | 715/205 |
| 6,105,033 | A * | 8/2000 | Levine | 707/101 |
| 6,613,098 | B1 * | 9/2003 | Sorge et al. | 715/234 |
| 6,763,496 | B1 * | 7/2004 | Hennings et al. | 715/501.1 |
| 2003/0046639 | A1 * | 3/2003 | Fai et al. | 715/513 |
| 2003/0061201 | A1 * | 3/2003 | Grefenstette et al. | 707/3 |
| 2004/0088332 | A1 * | 5/2004 | Lee et al. | 707/200 |
| 2004/0267595 | A1 * | 12/2004 | Woodings et al. | 705/9 |
| 2006/0101100 | A1 * | 5/2006 | Konidena et al. | 707/204 |

\* cited by examiner

*Primary Examiner*—Charles Rones
*Assistant Examiner*—Belix M Ortiz
(74) *Attorney, Agent, or Firm*—Kenyon & Kenyon LLP (57) ABSTRACT

A system and a method for displaying and analyzing a business process based on the document flow of that business process. The graphical user interface may graphically display a set of documents relevant to a business process and the linkages between the set of documents as a document chain on a computer display to facilitate analysis of a business process. The linkages may represent change processes or binary relationships. A subset of documents may be filtered from the group of documents. The filtering may be performed based on a type of linkage. The subset of documents may be all successors of a starting document, all predecessors of the starting document, all successors of a root document of the starting document, or all successors and predecessors of the starting document. The graphical user interface may further graphically display items within documents and the linkages between the items. The graphical user interface may further display details about the selected document.

28 Claims, 10 Drawing Sheets

Trans. No. / Trans. Type / Sold-To Party 741

▽ ➡ 50022745 LEAS Lease QM_BP1A 742
  ▷ 🗎 Items 743
  ▷ 🔗 Linked Objects 744
  ▽ ➡ 50022754 LEAO Lease Quotation QM_BP1A 742
    ▷ 🗎 Items 743
    ▷ 🔗 Linked Objects 744
    ▽ ➡ 50022758 LEAS Lease QM_BP1A 742
      ▷ 🗎 Items 743
      ▷ 🔗 Linked Objects 744
      ▽ ➡ 50022762 LEAO Lease Quotation QM_BP 742
        ▷ 🗎 Items 743
        ▷ 🔗 Linked Objects 744
        ▽ ➡ 50022769 LEAS Lease QM_BP1A 742
          ▷ 🗎 Items 743
          ▷ 🔗 Linked Objects 744
    ▽ ➡ 50022944 LEAS Lease QM_BP1A 742
      ▷ 🗎 Items 743
      ▷ 🔗 Linked Objects 744
    ▽ ➡ 50022768 LEAS Lease QM_BP1A 742
      ▷ 🗎 Items 743
      ▷ 🔗 Linked Objects 744

Fig. 8c ns between documents.

DISPLAYING AND ANALYZING DOCUMENT FLOWS

TECHNICAL FIELD OF THE INVENTION

The invention relates to the field of document management. More particularly, the present invention relates to displaying documents in a way that explicitly demonstrates the connectio

BACKGROUND OF THE INVENTION

Business processes that last over a period of several years, and evolve over that period, lead to a lot of documents. These documents may evolve by changes to the original agreement, execution of options, and the like. Each of these evolutions lead to a new document. That new document is linked to the preceding document. By analyzing the flow of such documents, one can get a sense of the progress of the overall business process. However many of these business transactions are highly complex with too many documents to process in an efficient manner.

DETAILED DESCRIPTION

A system and a method for displaying and analyzing a business process based on the document flow of that business process. The graphical user interface may graphically display a set of documents relevant to a business process and the linkages between the set of documents as a document chain on a computer display to facilitate analysis of a business process. The linkages may represent change processes or binary relationships. A subset of documents may be filtered from the group of documents. The filtering may be performed based on a type of linkage. The subset of documents may be all successors of a starting document, all predecessors of the starting document, all successors of a root document of the starting document, or all successors and predecessors of the starting document. The graphical user interface may further graphically display items within documents and the linkages between the items. The graphical user interface may further display details about the selected document.

Figure 1:
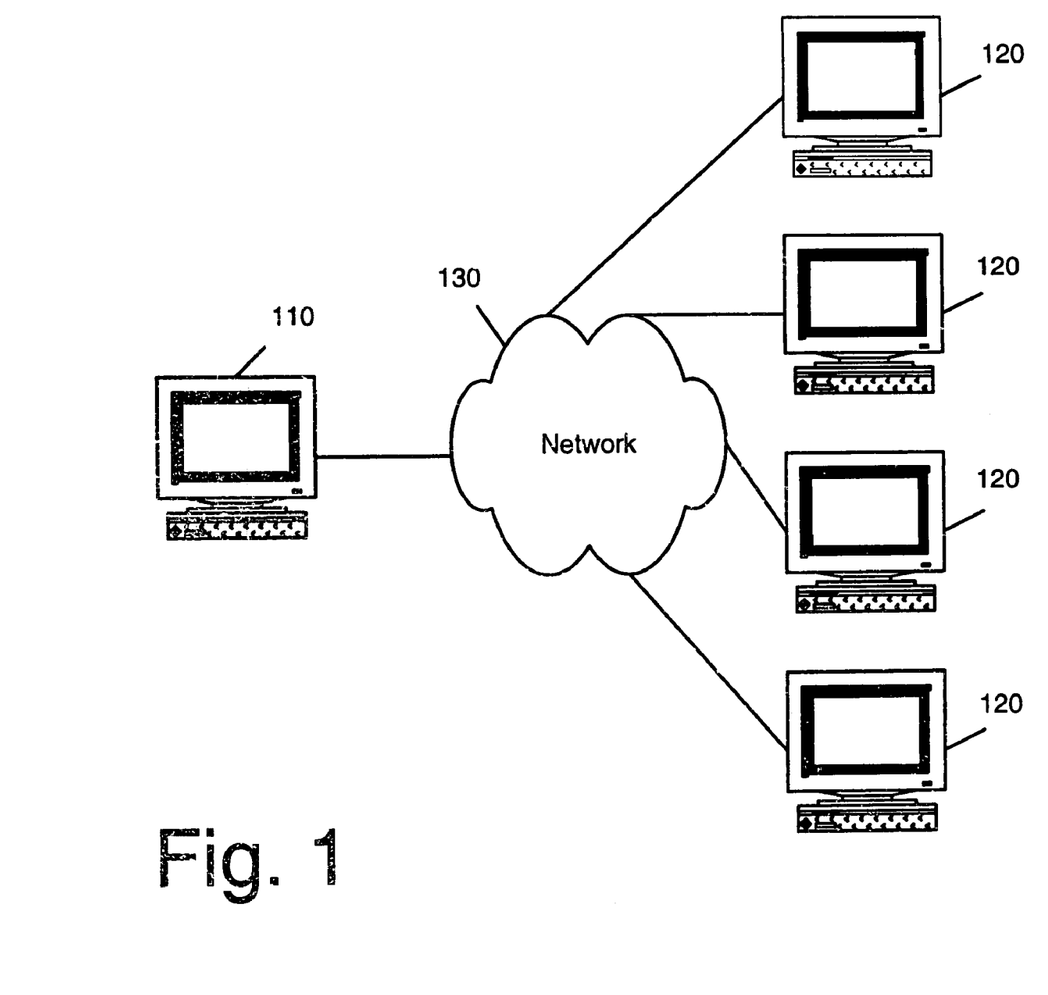
FIG. 1 is a block diagram that depicts a possible computer-implemented decision support system in accordance with an embodiment of the present invention.

FIG. 1 illustrates the components of a possible system and basic computer and network architecture that may implement the decision support method in accordance with an embodiment of the present invention. The decision support system 100 includes a master terminal 110 and one or more user terminals 120 connected through a network 130. The production manager may implement the decision support method from the master terminal 110, or alternatively, from one of the user terminals 120 or from any other device that may implement the method and is linked or connected in some manner to the system 100. The user terminals 120 may receive reports and instructions resulting from the decision support method, as well as any other additional information or instructions from the production manager or co-workers.

One or more of the terminals 110, 120 may be personal computers, computer workstations, handheld personal digital assistants ("PDA"), or any other type of microprocessor-based device.

The network 130 may be a local area network (LAN), wide area network (WAN), remote access network, an intranet, or the Internet, for example. Network links for the network 130 may include telephone lines, DSL, cable networks, T1 or T3 lines, wireless network connections, or any other arrangement that implements the transmission and reception of network signals. However, while FIG. 1 shows the terminals 110, 120 connected through a network 130, the terminals 110, 120 may be connected through other means, including directly hardwired or wirelessly connected. In addition, the terminals 110, 120 may be connected to other network devices not shown, such as wired or wireless routers and servers. The terminals 110, 120 may also be connected to one or more peripheral devices, such a local or network printer, mouse, display, storage drives, etc.

Figure 2:
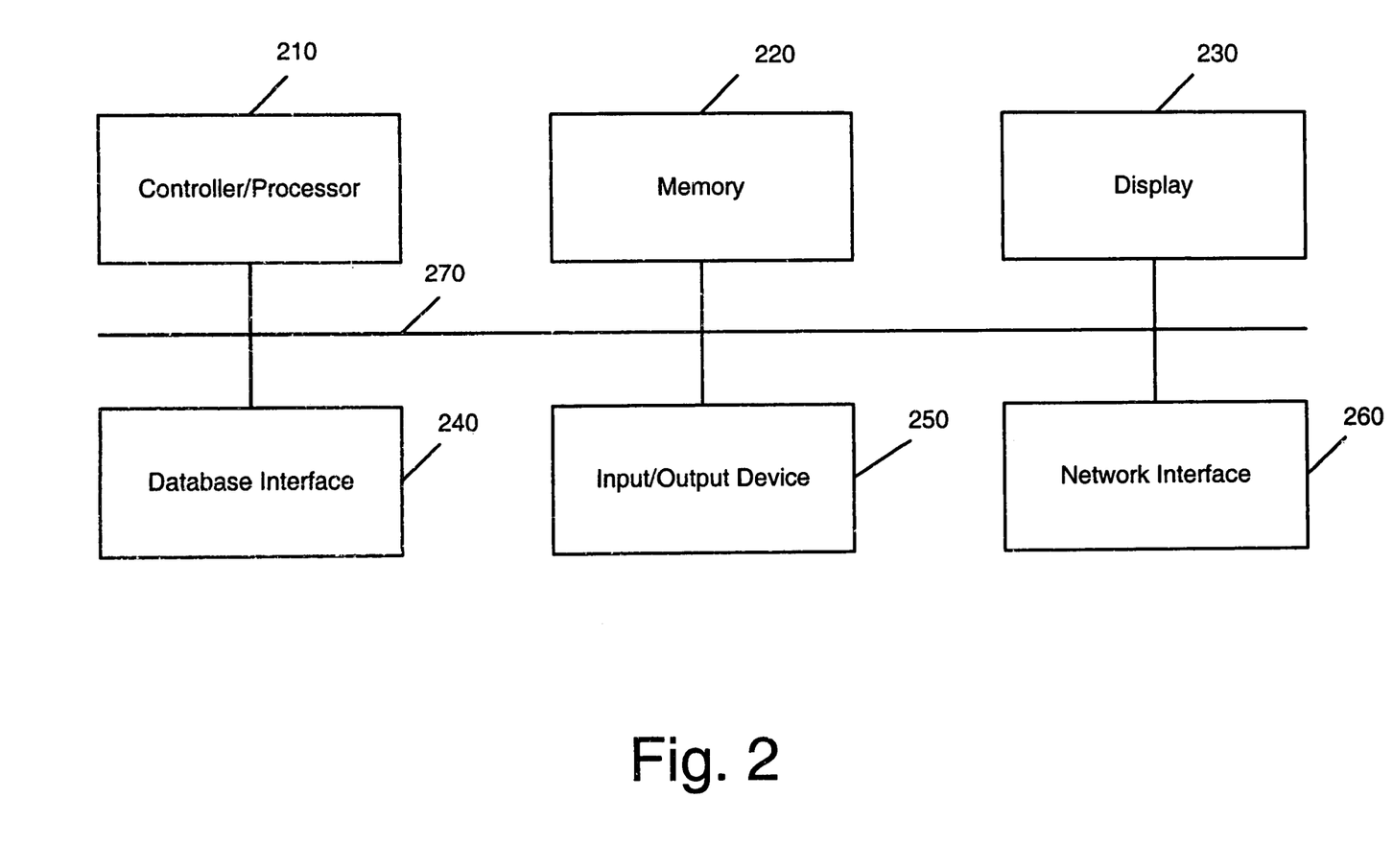
FIG. 2 is a block diagram that depicts the possible structure of a work station in the computer-implemented decision support system of FIG. 1 in accordance with an embodiment of the present invention.

FIG. 2 illustrates a possible configuration of a master terminal 110 (the user terminal 120 may also have a similar configuration). The master terminal 110 may include a controller/processor 210, memory 220, display 230, database interface 240, input/output device interface 250, and network interface 260, connected through bus 270.

The controller/processor 210 may be any programmed processor known to one of skill in the art. However, the decision support method can also be implemented on a general-purpose or a special purpose computer, a programmed microprocessor or microcontroller, peripheral integrated circuit elements, an application-specific integrated circuit (ASIC) or other integrated circuits, hardware/electronic logic circuits, such as a discrete element circuit, a programmable logic device, such as a PLD, PLA, FPGA, or PAL, or the like. In general, any device or devices capable of implementing the decision support method as described herein can be used to implement the decision support system functions of this invention.

The Input/Output interface 250 may be connected to one or more input devices that may include a keyboard, mouse, pen-operated touch screen or monitor, voice-recognition device, or any other device that accepts input. The Input/Output interface 250 may also be connected to one or more output devices, such as a monitor, printer, disk drive, speakers, or any other device provided to output data.

The memory 220 may include volatile and nonvolatile data storage, including one or more electrical, magnetic or optical memories such as a RAM, cache, hard drive, CD-ROM drive, tape drive or removable storage disk.

The network interface 260 may be connected to a communication device, modem, network interface card, or any other device capable of transmitting and receiving signals over a network 130. The components of the terminals 110, 120 may be connected via an electrical bus 270, for example, or linked wirelessly.

Client software and databases may be accessed by the controller/processor 210 from memory 220 or through the database interface 240, and may include, for example, database applications, word processing applications, the client side of a client/server application such as a billing system, as well as components that embody the decision support functionality of the present invention. The terminals 110, 120 may implement any operating system, such as Windows or UNIX, for example. Client and server software may be written in any programming language, such as ABAP, C, C++, lava or Visual Basic, for example.

Figure 3:
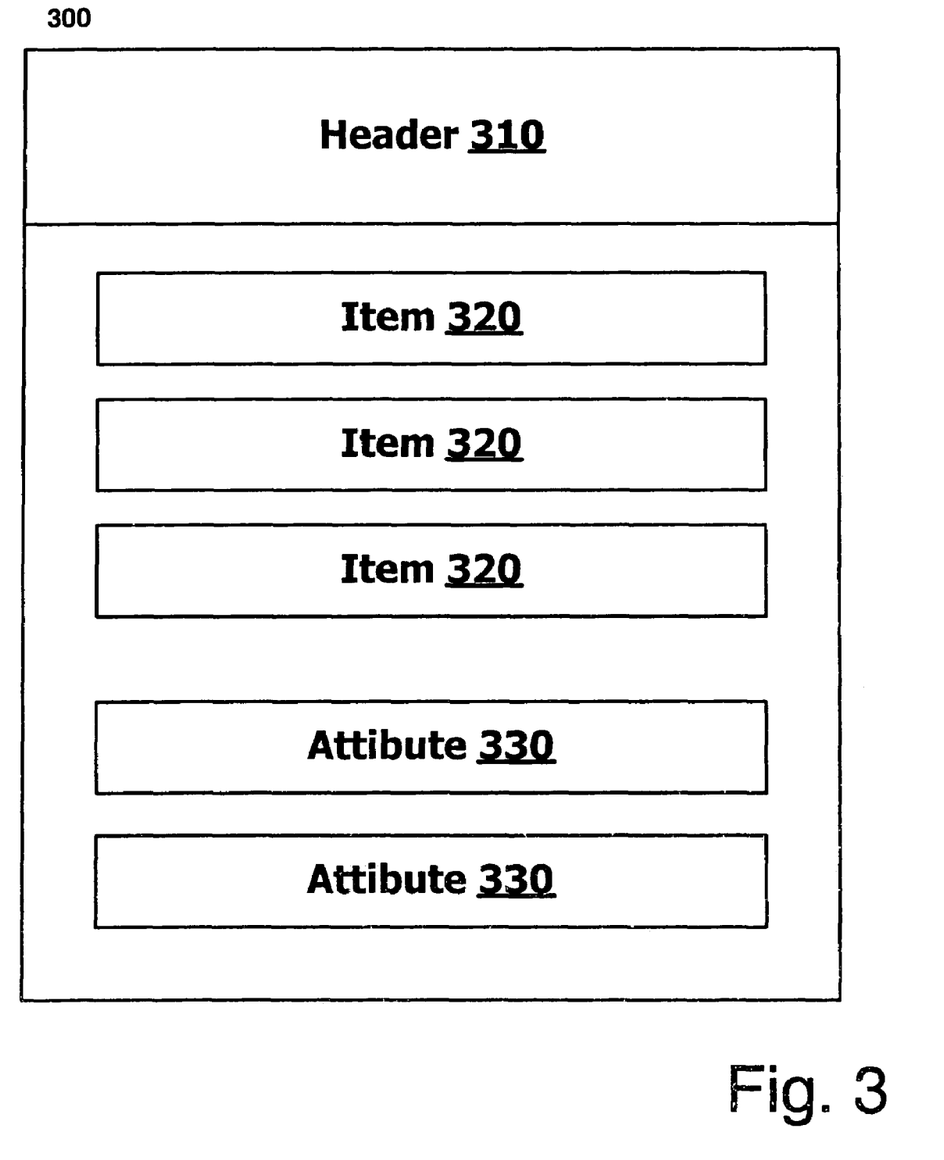
FIG. 3 is a block diagram of one embodiment of a generic document as it may be stored in one embodiment of the document analyzer.

The document flow analyzer may be used to analyze the course of a business process as memorialized in the business documents controlling the process. FIG. 3 shows one embodiment of a generic document 300 as it may be stored in one embodiment of the document analyzer. The document 300 may have a document header 310 that contains storage information as well as placement information describing the function of the document in the business process. The document header 310 may be used to signify to the system what other documents a document is linked. The document 300 may also have one or more action items 320 containing setting data describing the transactions of the business process and result data produced by the business process. The document 300 may have attributes describing the form and structure of the document.

Figure 4:
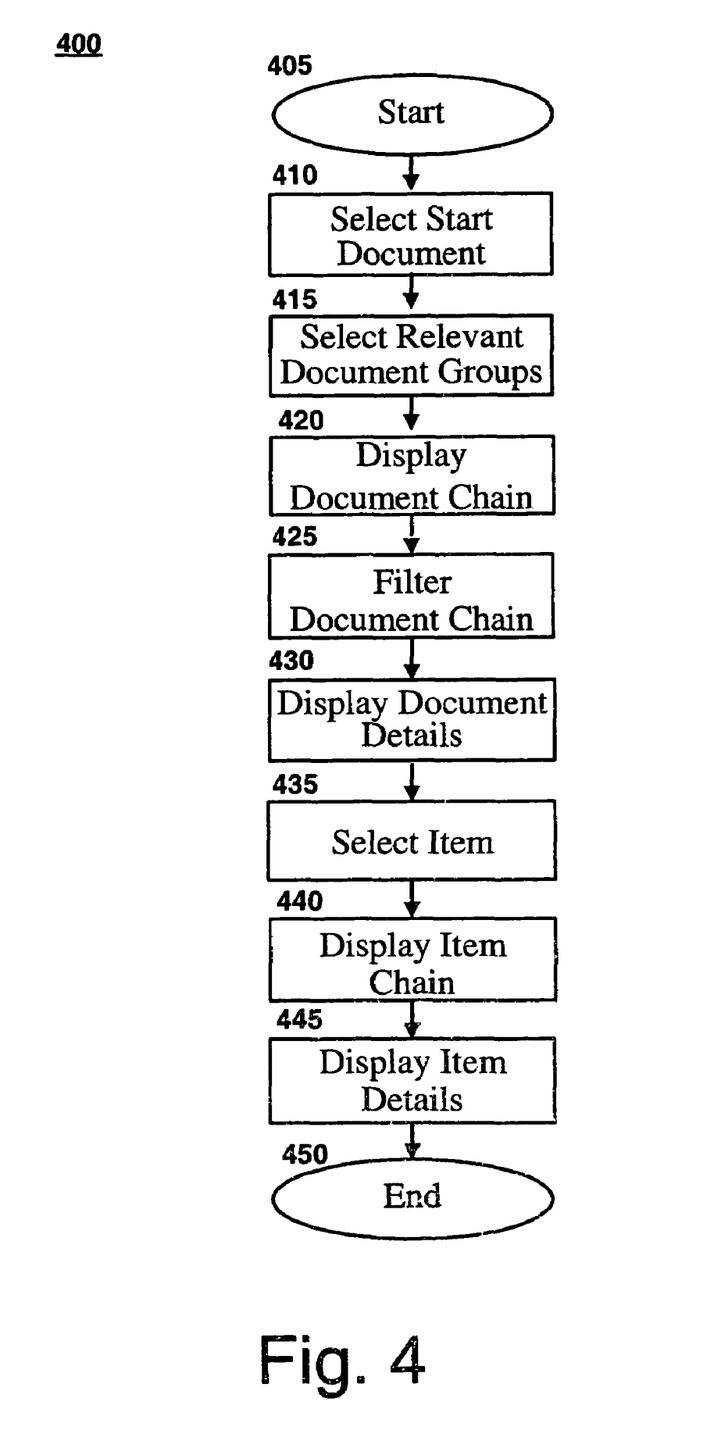
FIG. 4 is a flowchart of one embodiment of a method of using the document flow analyzer.

FIG. 4 illustrates in a flowchart one embodiment of a method 400 of using the document flow analyzer. The process begins (Block 405) when, upon receiving input from a user via the input/output device 250, the processor 210 selects a start document (Block 410). Based upon the start document, the processor 210 selects a group of all documents relevant to a specific business process represented in the start document (Block 415). The display 230 then displays a document chain representing all relationships, or linkages, between the relevant group of documents (Block 420). Based on specifications provided by the user, the processor 210 filters the document chain to focus on specific documents of interest (Block 425). The display 230 displays the details of the selected start document (Block 430). Upon receiving input from a user via the input/output device 250, the processor 210 selects an item in the document (Block 435). The display 230 displays an item chain, showing all linkages between the selected item and other items in the document, as well as items in other documents (Block 440). The display 230 displays the details of the selected item (Block 445), ending the process (Block 450).

Figure 5:
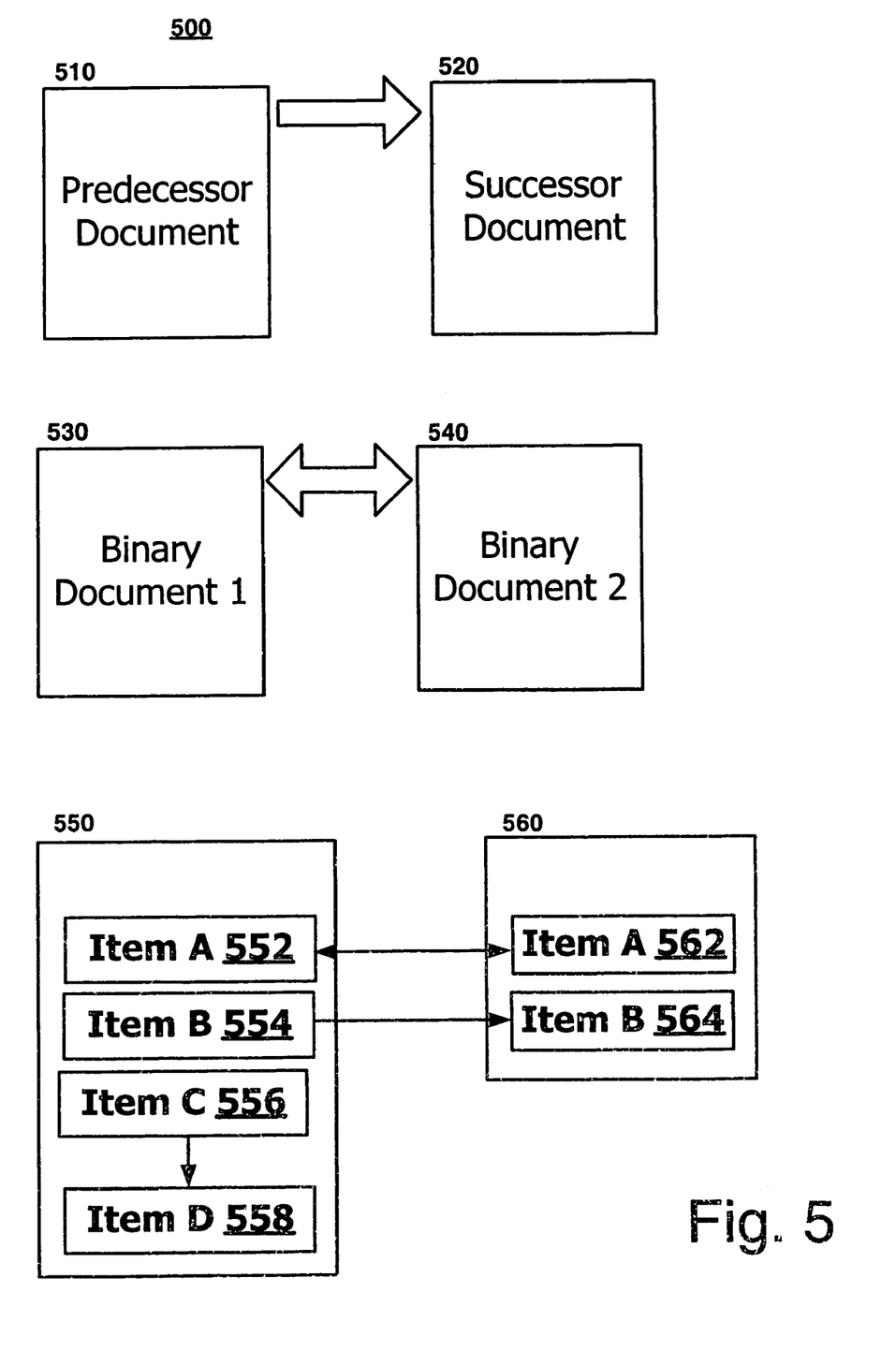
FIG. 5 is a block diagram of three different kinds of document linkages according to one embodiment of the present invention.

The document flow analyzer may differentiate between three different kinds of document linkages, illustrated in FIG. 5. A predecessor document 510 may be linked to a successor document 520 due to a change process. A change process usually occurs as a part of the business process. The linked documents in this instance have a chronological order. The change process may refer to changes to parts of a contract, such as changes in customer preferences or damages to a leased object. An outbound change process occurs when a follow up document 520 is created to an original document 510. For example, a lease agreement may lead to a lease quotation, or a sublease agreement.

A first binary document 530 may be linked to a second binary document 540 in a binary linkage. The binary linkage refers to two documents linked due to a binary relationship, or a relationship not created by a change process. For example, every time a leasing item is created, a master agreement is assigned to that item which contains the general terms and conditions. A leasing item may have a master agreement, a vendor invoice, and a billing document.

Further, linkages may exist on an item level with a global allocation identification (GAID), between items of a combined contract, and due to an upgrade process. The GAID or other identifiers may be used by the document flow analyzer to signify links between the items. The linkages may be binary linkages, such as between Item A 552 of a first document 550 and Item A 562 of a second document 560. The linkages may be change process linkages, such as between Item B 554 of a first document 550 and Item B 564 of a second document 560. Furthermore, linkages may occur between items in the same document, such as between Item C 556 and Item D 558 of a document 550. These may be due to an inbound change process. An inbound change process does not create a new document, but rather a new item inside the same document. The new item is linked to the old item.

Figure 6:
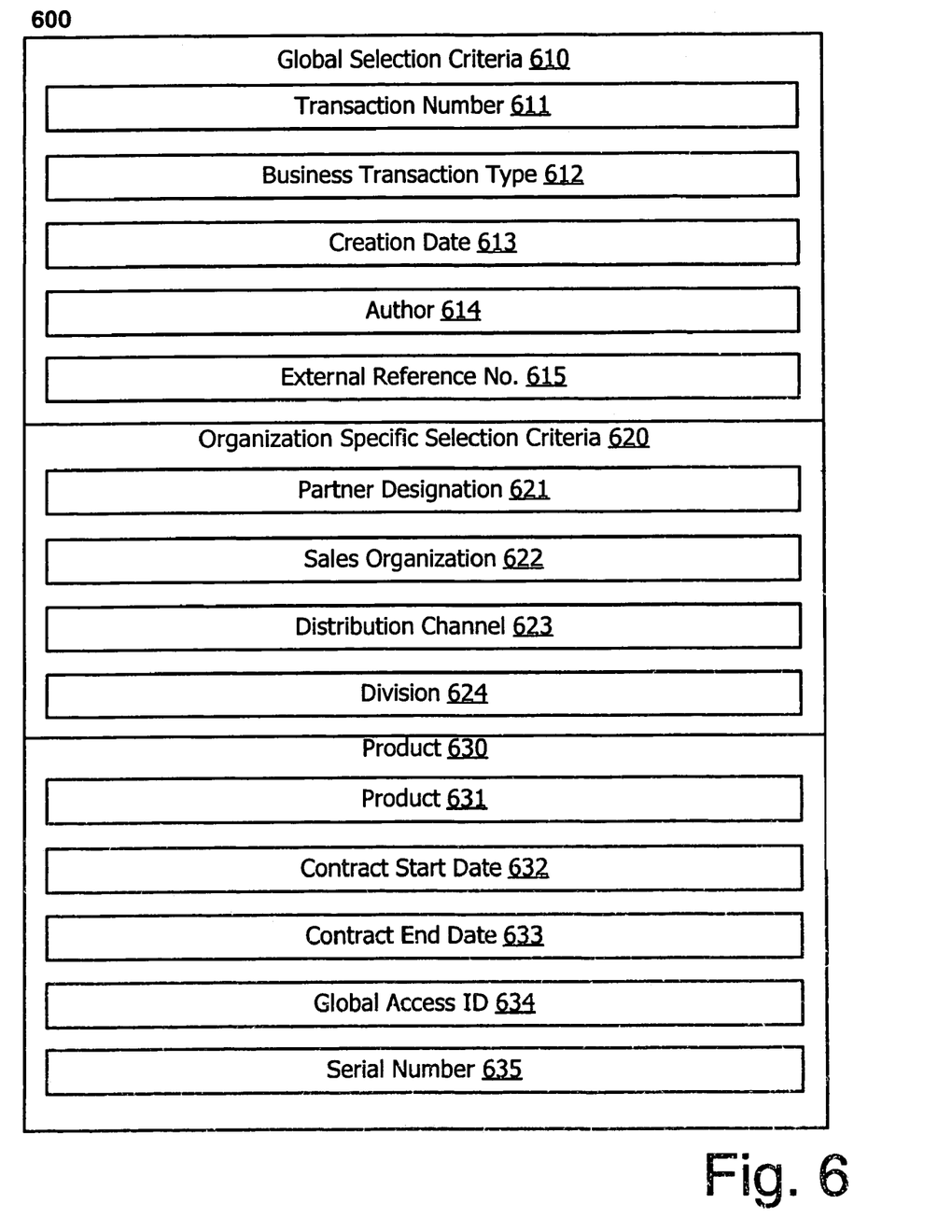
FIG. 6 is a block diagram of one embodiment of a selection screen provided to the user by the document flow analyzer to allow the user to choose a start document

A selection screen 600 may be provided to the user by the document flow analyzer to allow the user to choose a start document, as shown in FIG. 6. The selection screen may have a global selection criteria window 610, an organization specific selection criteria window 620, and a product window 630. The global selection criteria window 610 may allow for selection by transaction number 611, business transaction type 612, creation date 613, author 614, or external reference number 615. The organization specific selection criteria window 620 may allow for selection by partner designation 621, sales organization 622, distribution channel 623, and division 624. The product window 630 may allow for selection by product 631, contract start date 632, contract end date 633, GAID 634, or serial number 635.

Figure 7A:
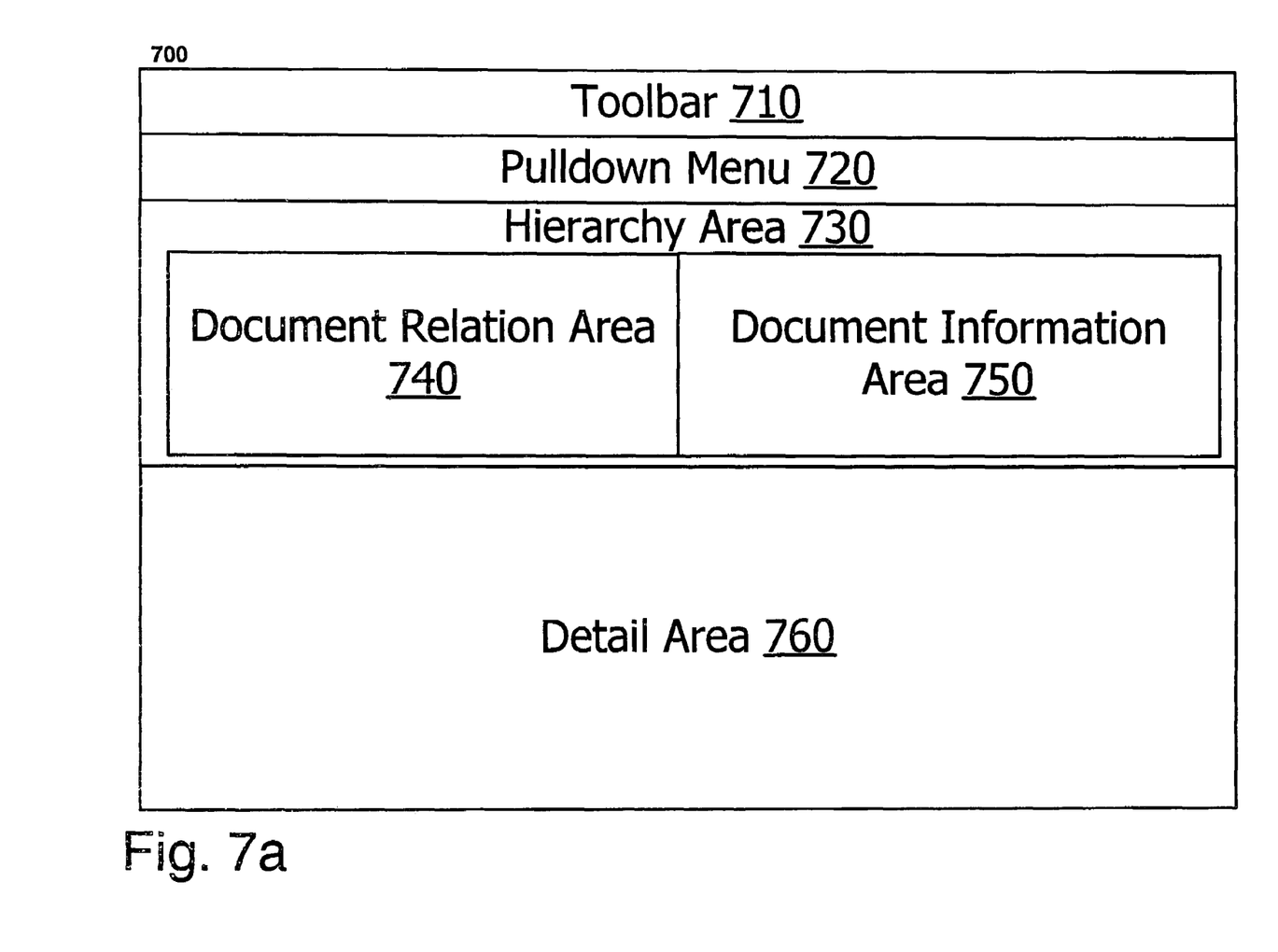
FIGS. 7a-b are block diagrams of one embodiment of a graphical user interface (GUI) to display the document chain.

The document chain may be displayed using a graphical user interface (GUI) 700, as shown in FIG. 7a. The GUI 700 may have standard GUI tools such as a toolbar 710 and pulldown menu 720. The GUI 700 may have a hierarchy area 730 to display the dependencies of the documents or items in the documents. The hierarchy area 730 may have a document relation area 740 to display the documents or items in a hierarchy. The document relation area 740 may show the documents as explicitly linked icons, a list of varying detail, a root directory, or a tree. The hierarchy area 730 may also have a document information area 750 to display information about the documents or items. This information may include information about the items in a document. The GUI 700 may have a detail area 760 to display detail information about a document or an item. The detail area 760 may include information about the organization producing the document, status of the document, partners involved, conditions to be met, and other additional data. The GUI may show a document view or an item view. The information shown in the document information area 740 or in the detail area 760 may be customized to a user's tastes or specifications.

Figure 7B:
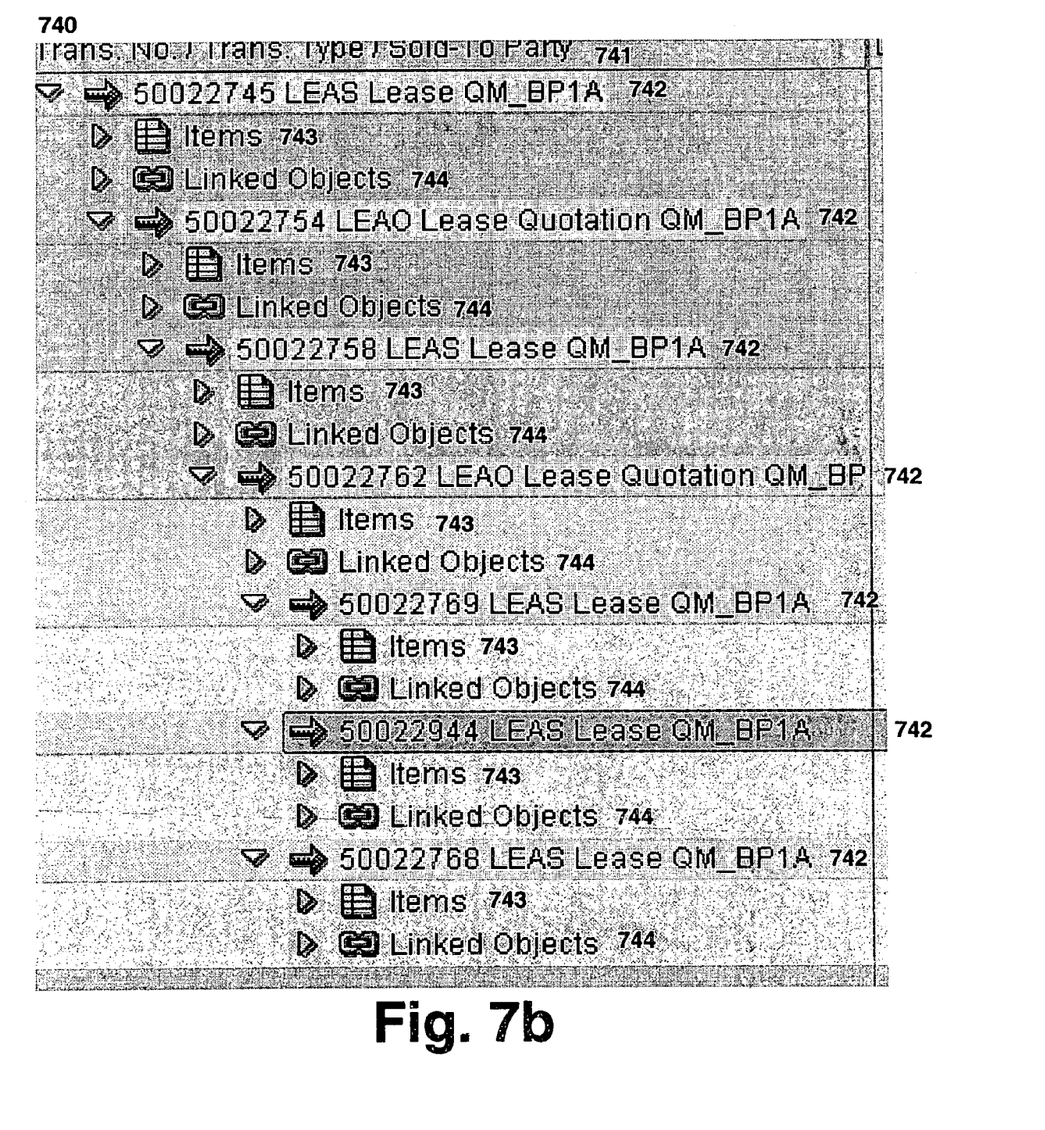

FIG. 7b illustrates one embodiment of the document relation area 740, in which the document relation area 740 is presented as a root directory. A business process may be listed in the title section 741. An arrow icon may show each document linked by a change process 742. A chain icon may show each document linked by a binary process 743. A document icon may show each item linked to the previous document 744. For example, the business process may be a leasing agreement 741, with a lease and a lease quotation 742, a vendor invoice and a bill 743, and related provisions 744.

Parameters that may be used to determine layout and amount of selected data include reporting path, binary relation, transaction types, document types, item types, status conditions on an item level, column area, and data to be read.

These parameters may be customized, with certain types of these parameters excluded, to the taste of the users. These parameters are encapsulated in so called "reporting views". The reporting views may be maintained in customizing. The user has to choose one reporting view before executing the program. The parameters of the chosen reporting view are used as default parameters, but may be changed temporarily by the user online. Furthermore the user may change the reporting view or select another starting document without restarting the program. So the displayed data may be changed in a very flexible manner.

Figure 8A:
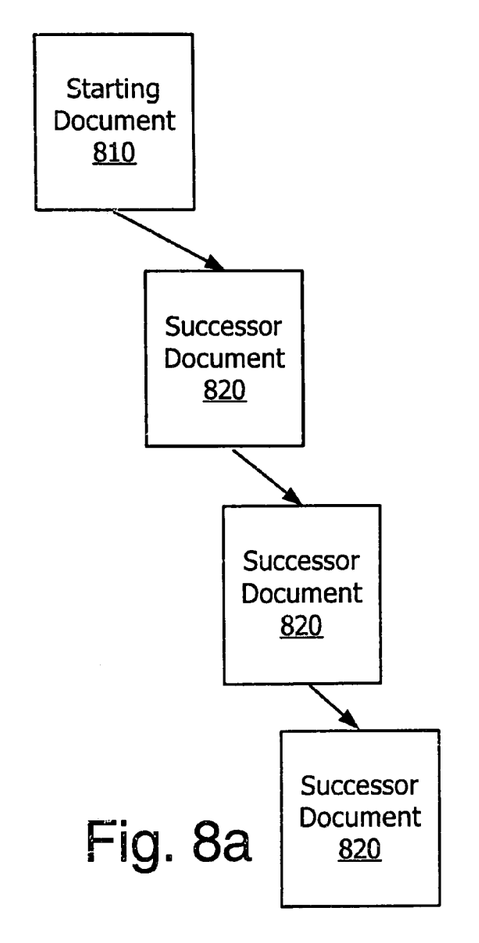
FIGS. 8a-d are block diagrams of embodiments of various types of reporting paths.
Figure 8B:
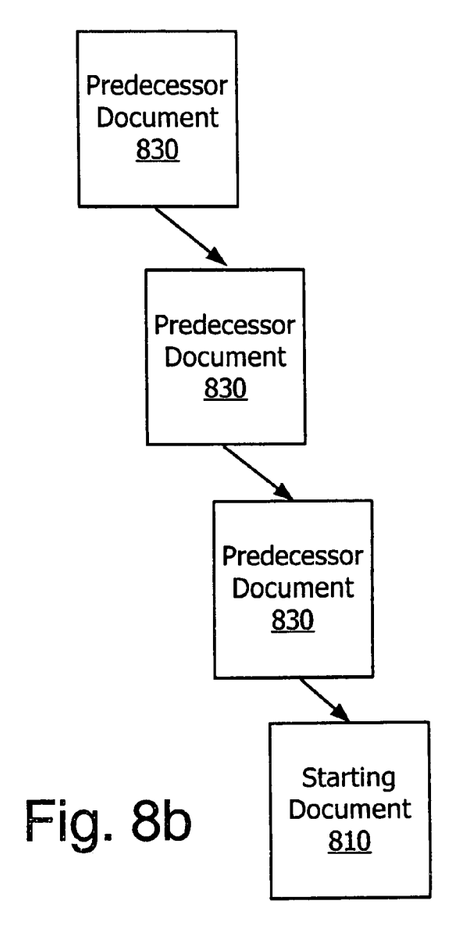
Figure 8C:
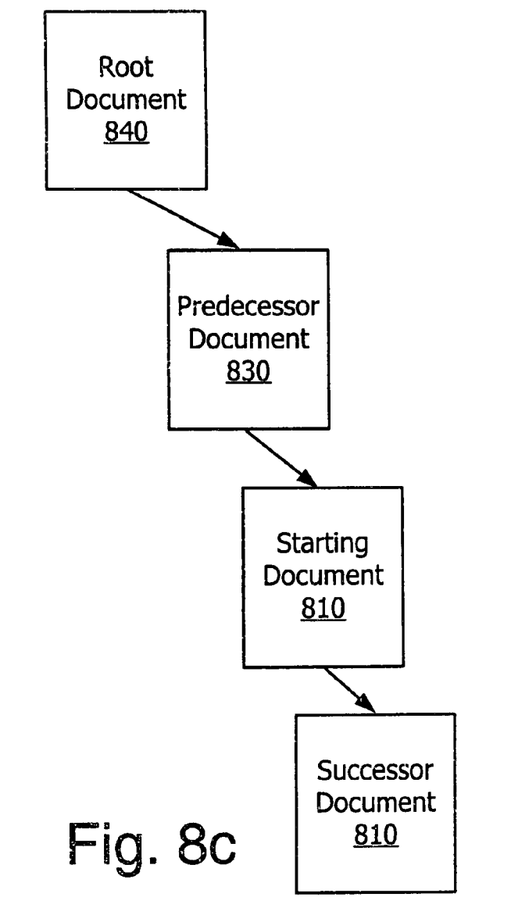
Figure 8D:
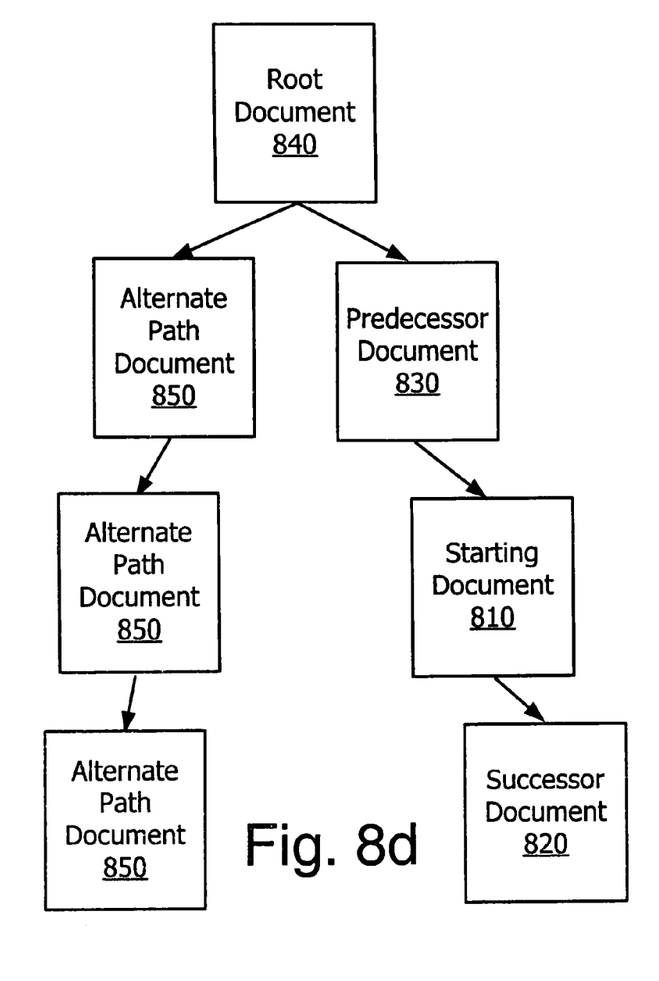

Various types of reporting paths may be used, as shown in FIGS. 8a-d. Each of these is based on which document is chosen as the starting document 810. As shown in FIG. 8a, one reporting path option is the successors only option. Only the successor documents 820 for the starting document 810 are displayed. As shown in FIG. 8b, one reporting path option is the predecessors only option. Only the predecessor documents 830 for the starting document 810 are displayed. As shown in FIG. 8c, one reporting path option is the direct path option. The successor documents 820 and the predecessor documents 820 for the starting document 810 are displayed, including the root document 840. The root document 840 is the first document chronologically in the chain. As shown in FIG. 8d, one reporting path option is the all option. All successor documents 820 for the root document 840 are displayed. This path includes alternate path documents 850, which may be successor documents for the root document 840, but are not in the direct path of the starting document 810.

A GAID reporting path may also be displayed. This path includes all documents that have at least one item with a GAID that matches a GAID entered by the user. This path may be used if the user wants to identify a special deal by the GAID and read all items over several documents with that GAID.

Binary relations may be excluded from the display based on their process type. This exclusion reduces the number of selected and displayed documents. For example, all master agreements or billing documents may be excluded from display.

A special item view may be displayed, showing an item overview. The item overview displays all items in a table and not in a hierarchy. This view allows a user to view the items based on their status, such as active or inactive. If the status conditions are not fulfilled for all items of a document, the document will not be displayed in the hierarchy.

The columns in the document information area 750 and the detail area 760 may be customized as to which columns are displayed and in which order. The width and names of the columns may be adjusted or edited by the user. Certain columns may be emphasized in the display based on the user's needs.

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method for displaying a set of related documents representing a business process to facilitate efficient analysis of the business process, the method comprising:
    at a master computer having a processor and a memory, storing in a document header document linkages for each document of the set of related documents, the set of related documents representing the business process, and the document linkages representing types of business process relationships between linked documents of the set of related documents;
    storing information in the document header for each document of the set of documents which describes a function in the business process for each document;
    responsive to a first input command received via a network from a user computer, selecting the set of documents relevant to the business process;
    graphically displaying on the user computer the set of documents;
    responsive to a second input command received via the network from the user computer selecting a set of linkages between the set of documents;
    graphically displaying on the user computer the set of linkages as a document chain illustrating the business process, wherein document linkages for each type of business process relationship are represented by different document link icons, and wherein the business process relationship type includes a change process relationship and a binary relationship, wherein a chance process relationship is characterized by a chronological progression from a predecessor document to a successor document, and wherein a binary relationship is characterized by documents that are related and independent;
    receiving specifications for filtering the document chain submitted by the user computer; and
    responsive to the specifications, filtering the document chain to display a subset of documents.

2. The method of claim 1, wherein the set of linkages represent change processes or binary relationships.

3. The method of claim 1, wherein filtering is performed based on a type of linkage.

4. The method of claim 1, wherein the subset is all successors of a starting document, all predecessors of the starting document, all successors of a root document of the starting document, or all successors and predecessors of the starting document.

5. The method of claim 1, further comprising:
    graphically displaying items within documents of the set of documents on the computer display; and
    graphically displaying linkages between the items on the computer display.

6. The method of claim 1, further comprising:
    selecting a document; and
    displaying details about the selected document.

7. A computer-readable storage medium storing a set of instructions capable of being executed by a storage controller to implement a method for processing data, the method comprising:
    storing document linkages for each document of a set of documents relevant to a business process in a document header, the document linkages representing types of business process relationships between linked documents of the set of related documents;
    storing information in the document header for each document of the set of documents which describes a function in the business process for each document;
    selecting the set of documents relevant to the business process;
    graphically displaying the set of documents on a computer display;
    selecting a set of linkages between the set of documents;
    graphically displaying the set of linkages as a document chain on the computer display illustrating the business process, wherein document linkages for each type of business process relationship are represented by different document link icons, and wherein the business process relationship type includes a change process relationship and a binary relationship, wherein a change process relationship is characterized by a chronological progression from a predecessor document to a successor document, and wherein a binary relationship is characterized by documents that are related and independent;

receiving specifications for filtering the document chain submitted by a user; and responsive to the specifications, filtering the document chain to display a subset of documents.

8. The computer-readable storage medium of claim 7, wherein the set of linkages represent change processes or binary relationships.

9. The computer-readable storage medium of claim 7, wherein filtering is performed based on a type of linkage.

10. The computer-readable storage medium of claim 7, wherein the subset is all successors of a starting document, all predecessors of the starting document, all successors of a root document of the starting document, or all successors and predecessors of the starting document.

11. The computer-readable storage medium of claim 7, further comprising:

graphically displaying items within documents of the set of documents on the computer display; and graphically displaying linkages between the items on the computer display.

12. The computer-readable storage medium of claim 7, further comprising:

selecting a document; and displaying details about the selected document.

13. A computer system, comprising:

a memory to store a group of documents, each document having a document header to identify document linkages with respect to the document and a function in the business process for the document, the document linkages representing types of business process relationships between linked documents of the set of related documents;

a processor/controller to:

select a set of documents from that group of documents and a set of linkages between the set of documents;

receive specifications for filtering the document chain submitted by a user; and responsive to the specifications, filter the document chain to a subset of documents; and a display device to graphically display the set of documents and the set of linkages between the set of documents as a document chain to facilitate analysis of the business process and to graphically display the filtered subset of documents, wherein document linkages for each type of business process relationship are represented by different document link icons, and wherein the business process relationship type includes a change process relationship and a binary relationship, wherein a chance process relationship is characterized by a chronological progression from a predecessor document to a successor document, and wherein a binary relationship is characterized by documents that are related and independent.

14. The computer system of claim 13, wherein the set of linkages represent change processes or binary relationships.

15. The computer system of claim 13, wherein the document chain is filtered based on a type of linkage.

16. The computer system of claim 13, wherein the subset is all successors of a starting document, all predecessors of the starting document, all successors of a root document of the starting document, or all successors and predecessors of the starting document.

17. The computer system of claim 13, wherein the display device graphically displays items within documents of the set of documents and linkages between the items.

18. The computer system of claim 13, further comprising a user interface to simultaneously display a set of workspaces on the display device, the user interface comprising:

a document relation workspace to display the document chain or the filtered subset of documents;

a customizable document information workspace to display information about the set of documents or items within the set of documents;

a customizable document detail workspace to display properties of a selected document from the set of documents or a selected item from the items within the set of documents; and a viewing workspace to display the selected document or the selected item.

19. The computer system of claim 18, wherein the displayed properties include a creator of the selected document, a status of the selected document, parties involved in the selected document, or unmet conditions in the selected document.

20. The method of claim 1, further comprising:

graphically displaying in a first workspace in a user interface the document chain or the filtered subset of documents;

graphically displaying in a second workspace in the user interface information about the document chain, filtered subset of documents, or items within the set of documents;

graphically displaying in a third workspace in the user interface properties of a selected document from the document chain or filtered subset of documents or a selected item from the items within the document chain or filtered subset of documents; and graphically displaying in a fourth workspace in the user interface the selected document or the selected item, wherein the user interface simultaneously displays the first, second, third, and fourth workspaces on a computer display.

21. The method of claim 20, wherein the displayed properties include a creator of the selected document, a status of the selected document, parties involved in the selected document, or unmet conditions in the selected document.

22. The set of instructions of claim 7, further comprising:

graphically displaying in a first workspace in a user interface the document chain or the filtered subset of documents;

graphically displaying in a second workspace in the user interface information about the document chain, the filtered subset of documents, or items within the set of documents;

graphically displaying in a third workspace in the user interface properties of a selected document from the document chain or filtered subset of documents or a selected item from the items within the document chain or filtered subset of documents; and graphically displaying in a fourth workspace in the user interface the selected document or the selected item, wherein the user interface simultaneously displays the first, second, third, and fourth workspaces on a computer display.

23. The set of instructions of claim 22, wherein the displayed properties include a creator of the selected document, a status of the selected document, parties involved in the selected document, or unmet conditions in the selected document.

24. A computer-implemented method comprising:

responsive to a first user command received at a master computer via a network from a user computer, selecting a document related to a business process from among a plurality of stored documents;

responsive to said selecting, retrieving a set of documents related to the business process;

graphically displaying to the user computer as a document chain the document, the set of documents, and document links representing types of business process relationships between the document and the set of documents, the document links being stored in the document and each of the set of documents; wherein document links for each type of business process relationship are represented by different document link icons, and wherein the business process relationship type includes a change process relationship and a binary relationship, wherein a change process relationship is characterized by a chronological progression from a predecessor document to a successor document, and wherein a binary relationship is characterized by documents that are related and independent;

displaying contents of the selected document, the contents including data items representing business process transactions and results, the data items each assigned an identifier;

responsive to a second user command received via the network from the user computer, selecting a data item from the selected document;

traversing item links associated with the selected data item identifier among the selected document and the set of documents to identify data items having the same identifier as the selected data item;

responsive to said traversing, retrieving the identified data items from the selected document and the retrieved set of documents; and graphically displaying to the user computer both contents of the selected data item, and as an item chain, the selected data item, the identified data items, and the item links representing types of data item relationships between the selected data item and the identified data items.

25. The method of claim 24, wherein the document links for each type of business process relationship are represented by different document link icons.

26. The method of claim 24, wherein the item links for each type of data item relationship are represented by different data item link icons.

27. The method of claim 25, wherein the business process relationship type includes a change process relationship and a binary relationship, wherein a change process relationship is characterized by a one-way dependency between a predecessor document and a successor document, and wherein a binary relationship is characterized by documents that are related and independent.

28. The method of claim 26, wherein the data item relationship type includes a change process relationship and a binary relationship, wherein a change process relationship is characterized by a one-way dependency between a predecessor data item and a successor data item, and wherein a binary relationship is characterized by data items that are related and independent.

\* \* \* \* \*

UNITED STATES PATENT AND TRADEMARK OFFICE
CERTIFICATE OF CORRECTION

PATENT NO. : 7,657,541 B2  Page 1 of 1
APPLICATION NO. : 10/946525
DATED : February 2, 2010
INVENTOR(S) : Peter Meuer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1227 days.

Signed and Sealed this

Thirtieth Day of November, 2010

David J. Kappos
*Director of the United States Patent and Trademark Office*